United States Patent

[11] 3,567,916

[72] Inventor James M. Fullton, Jr. Greensboro, N.C.
[21] Appl. No. 792,931
[22] Filed Jan. 22, 1969
[45] Patented Mar. 2, 1971
[73] Assignee The United States of America as represented by the Secretary of the Army

[54] APPARATUS FOR PARITY CHECKING A BINARY REGISTER
2 Claims, 5 Drawing Figs.

[52] U.S. Cl. ........ 235/153, 235/92
[51] Int. Cl. ........ G06f 11/08
[50] Field of Search ........ 340/146.1; 235/153, 92

[56] References Cited
UNITED STATES PATENTS

| | | | |
|---|---|---|---|
| 3,212,061 | 10/1965 | Merfeld | 235/153X |
| 3,342,983 | 9/1967 | Pitkowsky, et al | 235/153 |
| 3,470,364 | 9/1969 | Fullton, Jr. | 235/153 |

OTHER REFERENCES

Sellers, et al., ERROR DETECTING LOGOC FOR DIGITAL COMPUTERS. McGraw-Hill Co. 1968, pp. 183–190.

*Primary Examiner*—Malcolm A Morrison
*Assistant Examiner*—Charles E Atkinson
*Attorneys*—William G Gapcynski, Lawrence A Neureither, Leonard Flank and Robert C Sims

ABSTRACT: The parity of a shift register and a binary counter are checked by predicting what the parity change should be and comparing this with what the actual parity is. In checking a shift register the parity of the next state is determined by sensing the number of "ones" entering and leaving the register. This gives the change in the number of "ones" in the register; therefore, letting one know whether the parity will change or not. The same is done in checking a binary counter. All the consecutive "ones" (starting with the lowest order stage) are counted. With this any change in the parity of the next count can be predicted.

James M. Fullton, Jr.
INVENTOR

BY William G. Gapcynski
Lawrence A. Neureither
Leonard Flank
Robert C. Sims

James M. Fullton, Jr.
INVENTOR
BY William G. Gapcynski
Lawrence A. Neureither
Leonard Flank
Robert C. Sims James M. Fullton, Jr.
INVENTOR BY William G. Gapczynski
Lawrence A. Neureither
Leonard Flank
Robert C. Sims

APPARATUS FOR PARITY CHECKING A BINARY REGISTER

BACKGROUND OF THE INVENTION

This invention is concerned with the checking of the operation of the components of a data processor. The prior art devices required a duplication of the circuit of a register to check out the parity. This is very costly when one is dealing with a large date processor. Therefore, there has been a need for the present invention which eliminates a large part of the circuitry of the prior art devices.

SUMMARY OF THE INVENTION

The present invention concerns a method and electronic circuit for parity checking a register or counter in which the parity of the counter varies irregularly from state to state. For example, consider an ordinary binary counter having three binary stages. The parity of the sum of the stages is as follows:

| BINARY COUNT | PARITY |
|---|---|
| **000** | even |
| **001** | odd |
| **010** | odd |
| **011** | even |
| **100** | odd |
| **101** | even |
| **110** | even |
| **111** | odd |

It can be seen that the parity changes irregularly as the counter steps from state to state.

Assume that a three-stage binary counter is in the state 011. The next state is 100. In switching from 011 to 100, all the consecutive stages, starting from the lowest order, which are in the logic 1 state switch to logic 0, and the next succeeding stage changes from the 0 to the 1 state. Thus, by sensing the number of consecutive stages, beginning with the lowest order, which are in the 1 state, the number of stages changing into a different state can be predicted. A shift register can be checked by sensing the number of "ones" entering and the number of "ones" leaving. The difference will determine whether or not the parity will change.

A parity detector is connected to the circuit to be checked. The parity of the previous state is stored, and is changed or not changed in accordance to the results obtained by the next state indicator. This result is compared with the actual parity obtained by the circuit being checked and a fault indication is given if the two results are not the same.

DESCRIPTION OF THE PREFERRED EMBODIMENT

In a computer or a data processor some means is required to check out the operation of the processor while the program is being run. One of the best ways of checking for single (or odd number) errors of the registers and counters is to compare the actual parity with a predicted parity. In the usual sense, parity generation and checking consists of determining the modulo 2 sum of $n$ bits and generating a $(n+1)^{th}$ check bit such that the modulo 2 sum of the $n+1$ bits is always 1 (odd parity) or 0 (even parity). The modulo 2 sum as used in this description means that only the least significant bit of the binary sum is used. The sum of the $n+1$ bits is checked at some other location (or time) to verify their validity. Such a checking scheme is sufficient for the detection of a single error (or an odd number of errors). This is so because a single or an odd number of errors will cause the sum to change parity. In this system the parity can be considered as an additive type function in that a check bit is added to the $n$ bit word to provide a constant characteristic for the $n+1$ bit word.

If one were to analyze a circuit based on modulo 2, the initial state (state zero) would be $Ao1Ao2Ao3....Aon$. If this state is known, then the parity P is known and is the modulo 2 sum of the stages. $Po = Ao1 + Ao2 + Ao3 + ......AOn$. The next state (state 1) of the circuit will be $Al1Al2Al3.......Aln$. This is formed by complementing K bits of state zero; wherein K is greater than zero and less than $n$. The parity of state 1 is given by $P1 = Al1 + Al2 + Al3 + ......Aln$. If the number of bits K of state zero which were complemented to form state one is even, then $P1 = Po$, and if an odd number of bits were complemented, then $P1 = \overline{Po}$. If one considers K as being made up of logic 1's, then the parity of this could be represented by $Ko$. From this it can be seen that $P1 = Po = Ko$. The same argument can be generalized for the $m^{th}$ and $(m+1)^{th}$ states: $P(m = 1) = Pm + Km$. This formula can be called the prediction formula.

From the above it can be seen that the operation of such a circuit can be checked on a state-to-state basis by determining the $m^{th}$ state parity and storing it; determining the net change $Km$ needed to form the $(m+1)^{th}$ state; predicting the $(m+1)^{th}$ state parity by the prediction formula $P(m+1) = Pm + Km$; and checking the $(n+1)^{th}$ state parity and comparing it with the predicted parity.

Figure 1:
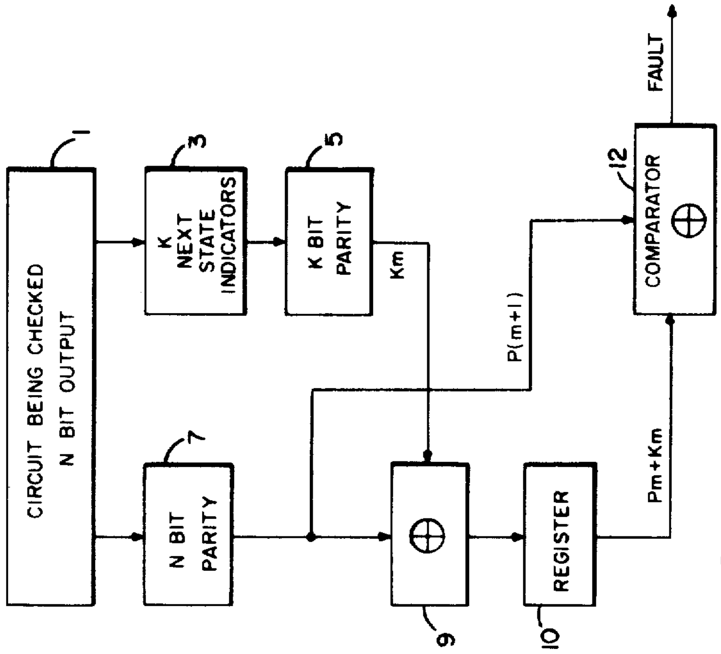
FIG. 1 is a block diagram illustrating the overall principles of the present invention.

The overall principle of the invention is illustrated in FIG. 1. An undefined circuit 1 is shown as the circuit to be checked. The outputs of a group of K next state indicators 3 are summed modulo 2 in a parity tree 5 to determine the net change in forming the next state of circuit 1. The present state parity is determined by another parity tree 7. These two parities are added and stored in add-store circuits 9 and 10. Circuit 9 is an exclusive OR circuit while circuit 10 is a store circuit. This represents the predicted parity for the next state of circuit 1. During the next state, the parity stored by store circuit 10 is compared with the actual parity by comparator 12. Comparator 12 is an exclusive OR circuit. If the two parities are not the same, then comparator 10 will generate a fault signal.

Figure 2:
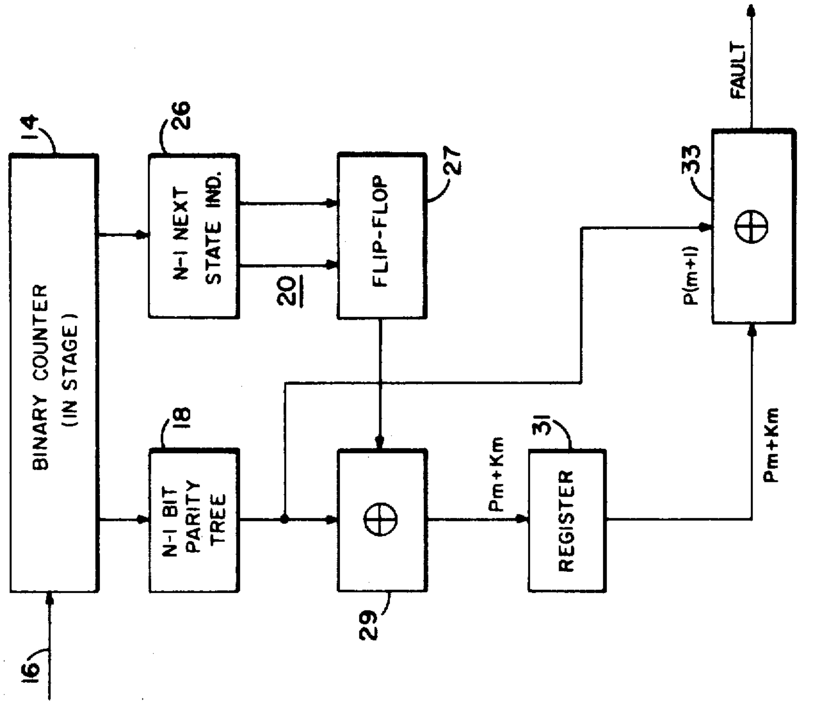
FIG. 2 is a block diagram of the error checking system as used on a binary counter.

FIG. 2 shows how a binary counter 14 can be checked. The binary counter 14 may be any of the well-known counters. Input clock pulses are fed to counter 14 from line 16 from a clock pulse generator, not shown. A binary counter has certain characteristics which will allow prediction of whether or not the parity of the next state of the counter will change. First, the least significant bit of the counter changes state each clock interval. The more significant bits of the counter will change state only if all bits of lesser significance are 1's. From this, one can see that if the number of consecutive stages having 1's, starting with the lowest order stage, is an even number (including zero), then the parity of the counter will change in the next count. However, if the number of consecutive 1's is an odd number, then the counter will not change parity in the next count.

Figure 3:
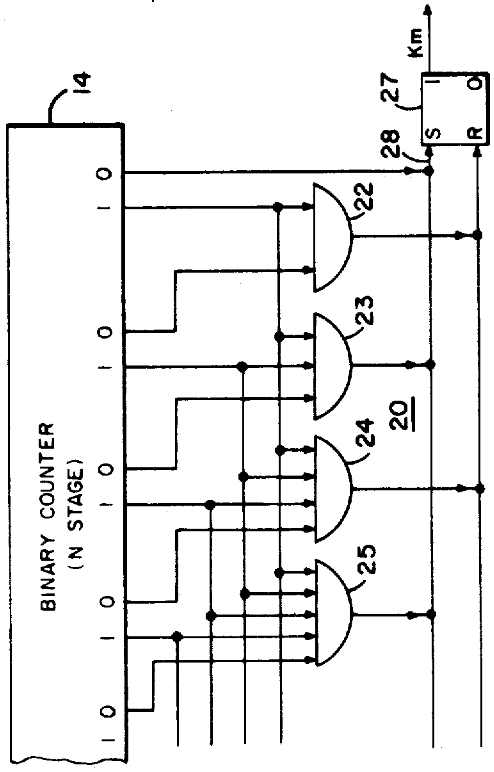
FIG. 3 is a schematic diagram showing a possible next state indicator circuit in greater detail.

From the above, it is seen that all the information that is needed to predict the next parity is: the present parity and whether the number of consecutive 1's is odd or even. The present parity is determined by a parity tree 18. Parity tree 18 may be any of the known parity sensing devices such as the one shown in U.S. Pat. No. 3,196,259 granted Jul. 20, 1965 to G. J. Erickson (see especially FIG. 4). Circuit 20 is the next state indicator system which determines whether the number of consecutive 1's is odd or even. It may be of any design such as the one shown in FIG. 3. Circuit 20 is made up of AND gates 22—25 (which would be the next state indicator 26 of FIG. 2) and S/R flip-flop 27. As can be seen from FIG. 3, if the 1 output of the least significant stage is 0 then none of the AND gates 22—25 will have an output, each AND gate has an input connected to one 0 side of a stage so that only one AND gate at a time can have a 1 output, and the 0 side of the least significant stage is connected directly to the set side of flip-flop 27. If the 0 side of the stages of counter 14 is not available, then the 1 side through an inverter could be used. It can be seen that if an even number of consecutive 1's are present at counter 14, then the reset side of flip-flop 27 will be activated and if an odd number of consecutive 1's are presented, then the set side of flip-flop 27 is activated. From this it is apparent that the set side (which is 1 when the set side is activated) represents $Km$ in the previous mentioned prediction formula $P(m+1) = Pm + Km$. A simplification of the circuit requirement would be to eliminate the even numbered AND gates and flip-flop 27. When this is done, then $Km$ can be obtained directly from line 28.

Referring back to FIG. 2, one can see that during the count $m$, exclusive OR circuit has as its inputs: $Pm$ from parity tree 18 and $Km$ from flip-flop 27. The output of circuit 29 will, therefore, be the modulo 2 sum of $Pm + Km$. As is known from the above-mentioned prediction formula, $Pm + Km$ gives the predicted parity of the next count ..$P(m+1)$.. of binary counter 14. This predicted parity is stored in register 31. A gating device and/or a buffer means which is responsive to the clock pulses could be interposed between circuit 29 and register 31 so as to prevent the changing of register 31 until the occurence of a clock pulse. However, this is not necessary if synchronizing means, not shown, are connected to the circuits of FIG. 2 to restrict their operation until the proper time. After the count of counter 14 is advanced to $P(m+1)$ an exclusive OR circuit 33 compares the predicted parity $Pm + Km$ to the actual parity $P(m+1)$. If the two do not agree, then circuit 33 produces a fault output which is sent to an error interrupt circuit, not shown. This pattern is repeated for each count of binary counter 14; therefore, giving a check of the counter for any single or odd number error that may occur.

Figure 4:
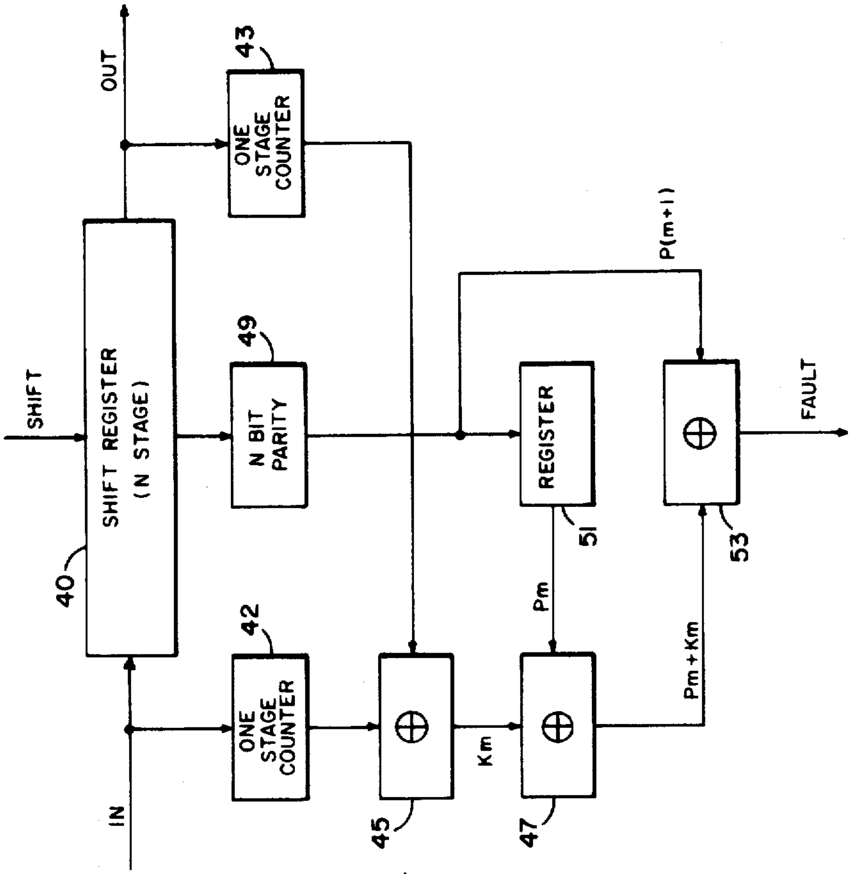
FIG. 4 is a block diagram of the error checking system for a shift register.

A shift register 40 having $n$ stages is shown in FIG. 4. It may take the form of any of the known shift registers having an input, output, and a shift command connection. The change of the shift register with respect to parity can be determined by the modulo 2 sum of the 1's shifted into and out of the register. This sum would represent $Km$ of the prediction formula. One simple way of obtaining this information is that shown in FIG. 4. Two one stage counters 42 and 43 detect the modulo 2 sum of the input and output to and from shift register 40. The outputs of the counters are combined in an exclusive OR circuit 45. The output of circuit 45 will represent $Km$ and is fed to one input of another exclusive OR circuit 47. The actual parity $Pm$ is derived by parity tree 49 and stored in register 51. Synchronizing means, not shown, control the gate timing of the circuits of FIG. 2. During the next operation $P(m+1)$ of shift register 40, the output of register 51 is fed to the other input of exclusive OR circuit 47. The output of circuit 47 will, therefore, be the predicted parity $Pm + Km$. This is sent to a third exclusive OR circuit 53 where it is compared with the actual parity $P(m+1)$. If the two do not agree then a fault signal is generated. This operation is repeated for successive operations of the shift register.

Figure 5:
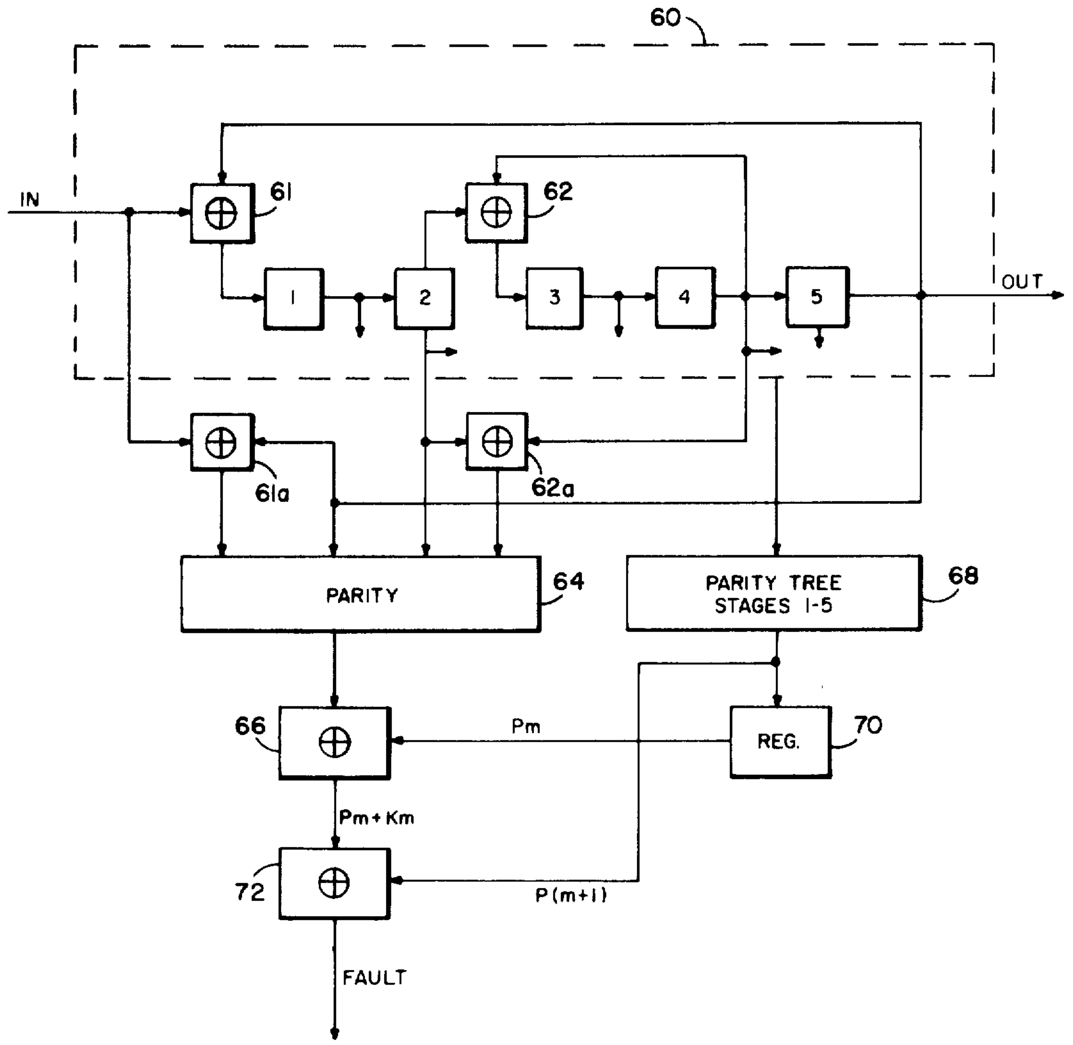
FIG. 5 is a block diagram of an error checker for a shift register having feedback.

FIG. 5 shows how the present invention can be utilized to check the operation of a shift register which has feedbacks. A five-stage shift register 60 is shown in FIG. 5 as having two feedbacks or reentry loops. The feedback networks are shown as exclusive OR circuits 61 and 62; however, many other type feedback networks could have been used. The outputs of stages 2 and 5 of register 60 must be considered as leaving the register, and the outputs of the two exclusive OR circuits 61 and 62 must be considered as inputs. These two circuits 61 and 62 are duplicated by exclusive OR circuits **61*a* and 62*a* which, having the same inputs, will have the same outputs. A parity circuit 64 is provided for producing $Km$ of the prediction formula. Said circuit could be of any design such as four one state counters connected to receive individual inputs. Two exclusive OR circuits could be tied to the output of pairs of the counters and a third exclusive OR circuit could be tied to the outputs of said first two. The output of the third circuit would be the output of the parity circuit 64. Parity circuit 64 will have further inputs from the output of stage 2 and of stage 5. Circuit 64 now has as inputs all the information leaving and entering shift register 60, and as in FIG. 4, the $Km$ is produced and fed to a further exclusive OR circuit 66**.

A parity tree 68 is connected (specific connections not shown) to the stages of shift register 60 so as to produce the actual parity of the register. The $Pm$ parity is fed to register 70 where it is stored until the synchronizing means, not shown, causes its output $Pm$ to be sent to circuit 66. There $Pm$ is combined with $Km$ to give the predicted parity $Pm + Km$. This is sent to exclusive OR circuit 72 where it is compared with the present actual parity $P(m+1)$. As before, a fault signal is generated if the two parities do not agree. The cycle of operation can be repeated over and over again for the duration of the program being run.

The overall invention permits the use of parity checks based on the net change from state to state in certain sequential-type circuits. This approach to error detection for such circuits is especially useful in cases where the circuits are normally duplicated for error detection. It can be easily envisioned the multitude of other circuits for which this error checking technique would be useful, particularly in the area of pseudorandom sequence generators in which modulo 2 sums are extensively employed to determine the next state. One might also consider two-step processes which would require an additional error checking step (complement then shift-type). Once the rules of operation for such circuits are established, the determination of the next state parity predictor circuit becomes straightforward. Therefore, it is desired that the scope of the invention be limited only by the appended claims.

I claim:

1. An error checking system for a binary counter comprising a binary counter having a plurality of stages, a parity tree having inputs connected to the stages so as to produce at its output the parity of said counter, a first exclusive OR circuit having a first input connected to the output of said parity tree, a next state indicator having an output and a plurality of inputs, the inputs of said indicator being connected to the stages of the binary counter, said next state indicator being so constructed as to produce a logic 1 output only when the counter has an even number of consecutive stages having a logic 1 starting with the lowest order stage, said next state indicator further being constructed so that it will produce a logic 0 on its output when the binary counter has an odd number of said consecutive stages, means connecting said output of said next state indicator to a second input of said first exclusive OR circuit, a register means having an input connected to an output of said first exclusive OR circuit for storing the information obtained from the first circuit during the next count of the binary counter, a second exclusive OR circuit having first and second inputs connected respectively to an output of said register and to the output of the parity tree, said second exclusive OR circuit comparing the parity now present on the counter with the information stored by the register on the previous count of the counter, and said second exclusive OR circuit having an output which will indicate a fault if it is a logic 1.

2. An error checking system for a binary shift register comprising a binary shift register having an input, output, and a plurality of stages, first and second one-stage counters, said first counter having its input connected to the input of said shift register, said second counter having its input connected to the output of said shift register, an exclusive OR circuit having first and second inputs connected to outputs of said first and second counters, a parity tree having inputs connected to the stages of said shift register and having an output which is the parity of the information in said register, a storage register having an input connected to the output of said parity tree so as to store the parity of the previous condition of the shift register, a second exclusive OR circuit having first and second inputs connected respectively to the outputs of said first exclusive OR circuit and said storage register so that the output of said second exclusive OR circuit is a predicted parity of the present condition of said shift register, a third exclusive OR circuit having first and second inputs connected respectively, to the outputs of the parity tree and the second exclusive OR circuit, and said third exclusive OR circuit having an output which will indicate a fault if it is a logic 1.